US011254318B2

(12) United States Patent
Uno

(10) Patent No.: US 11,254,318 B2
(45) Date of Patent: Feb. 22, 2022

(54) PASSENGER COMPARTMENT MONITORING METHOD AND PASSENGER COMPARTMENT MONITORING DEVICE

(71) Applicant: DENSO CORPORATION, Kariya (JP)

(72) Inventor: Keiichi Uno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/131,245

(22) Filed: Dec. 22, 2020

(65) Prior Publication Data

US 2021/0114600 A1  Apr. 22, 2021

Related U.S. Application Data

(63) Continuation of application No. PCT/JP2019/018476, filed on May 9, 2019.

(30) Foreign Application Priority Data

Jun. 26, 2018 (JP) .............................. JP2018-120955

(51) Int. Cl.
  *B60Q 1/00* (2006.01)
  *B60W 40/08* (2012.01)
  *B60W 50/14* (2020.01)

(52) U.S. Cl.
  CPC ............ *B60W 40/08* (2013.01); *B60W 50/14* (2013.01); *B60W 2040/0881* (2013.01); *B60W 2050/146* (2013.01)

(58) Field of Classification Search
  CPC ... B60W 2040/0881; B60W 2050/146; B60W 40/08; B60W 50/14; B61D 37/00; G08B 21/02; G08B 25/04; G08B 25/10; H04M 11/00; H04M 11/04

USPC ...................................................... 340/425.5
See application file for complete search history.

(56) References Cited

U.S. PATENT DOCUMENTS

| | | | | |
|---|---|---|---|---|
| 10,499,180 | B1* | 12/2019 | Harper ..................... | H04R 5/02 |
| 10,499,480 | B2* | 12/2019 | Yadav ..................... | H05B 45/20 |
| 2009/0112638 | A1* | 4/2009 | Kneller ................... | G06Q 10/00 |
| | | | | 705/5 |
| 2012/0313794 | A1* | 12/2012 | Riedel .................... | B64D 11/00 |
| | | | | 340/945 |
| 2013/0325325 | A1 | 12/2013 | Djugash | |
| 2019/0152418 | A1* | 5/2019 | Coughlin .......... | B60R 21/01566 |

FOREIGN PATENT DOCUMENTS

| | | | |
|---|---|---|---|
| JP | 2014-052774 | A | 3/2014 |
| JP | 2014052774 | A * | 3/2014 |
| JP | 2015-023459 | A | 2/2015 |
| JP | 2015-072510 | A | 4/2015 |
| JP | 2015072510 | A * | 4/2015 |
| JP | 2015-108854 | A | 6/2015 |

(Continued)

*Primary Examiner* — Naomi J Small
(74) *Attorney, Agent, or Firm* — Maschoff Brennan

(57) ABSTRACT

A passenger compartment of a vehicle, on which a plurality of passengers are boarded, is monitored. An individual presentation device for providing individual notification to each of the passengers is associated with each of the passengers boarding the passenger compartment. One of the passengers who is an actor of a predetermined specific action is specified. The actor is requested to stop the specific action using the individual presentation device associated with the actor.

7 Claims, 9 Drawing Sheets

(56) References Cited

FOREIGN PATENT DOCUMENTS

| | | | |
|---|---|---|---|
| JP | 2017-004119 | A | 1/2017 |
| JP | 2017-062594 | A | 3/2017 |
| JP | 2017-145590 | A | 8/2017 |
| JP | 2017-204144 | A | 11/2017 |
| JP | 2017204144 | A * | 11/2017 |
| JP | 2018-077752 | A | 5/2018 |
| JP | 2018077752 | A * | 5/2018 |

* cited by examiner

FIG. 2
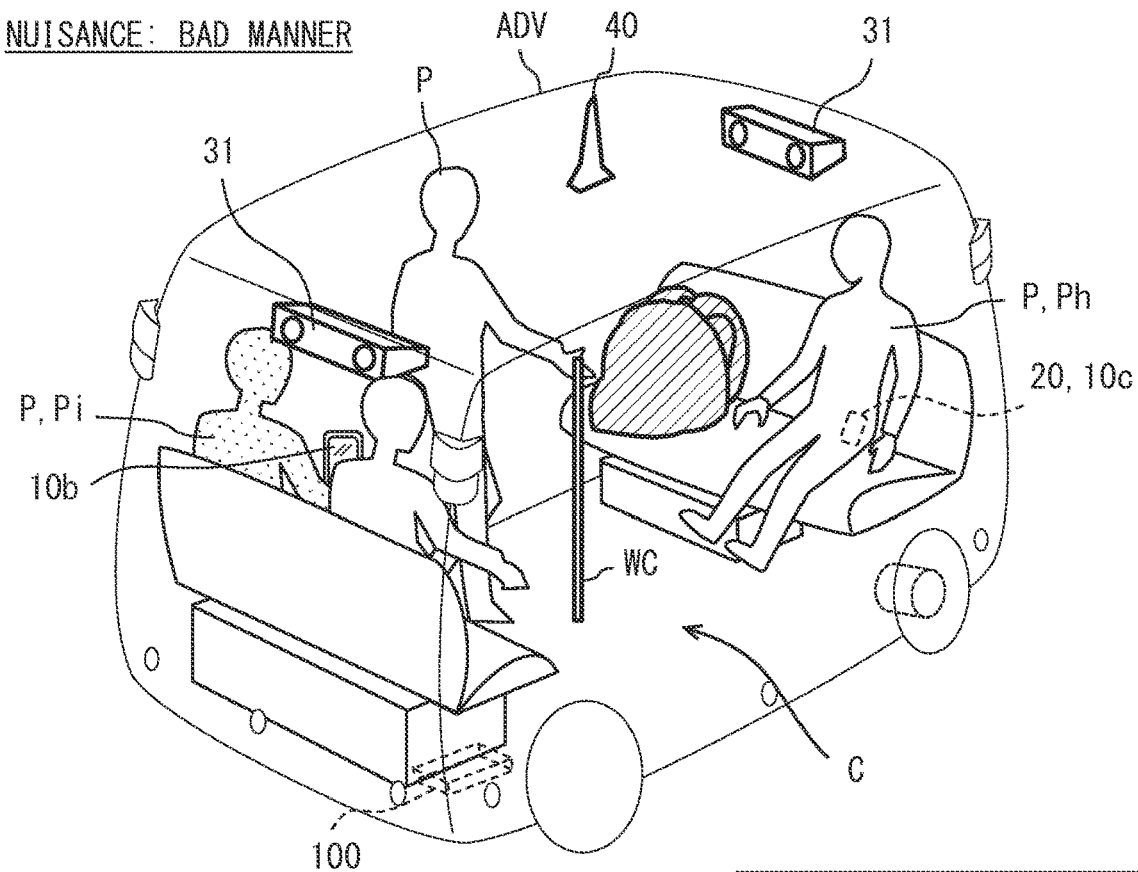
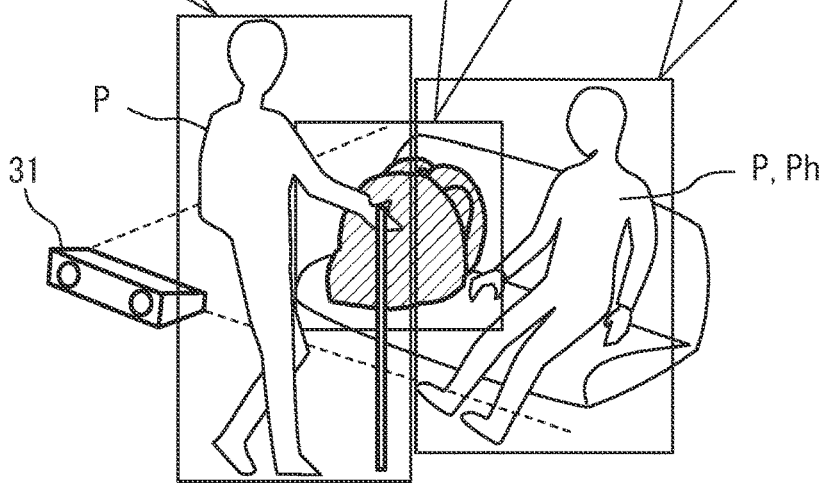

FIG. 3
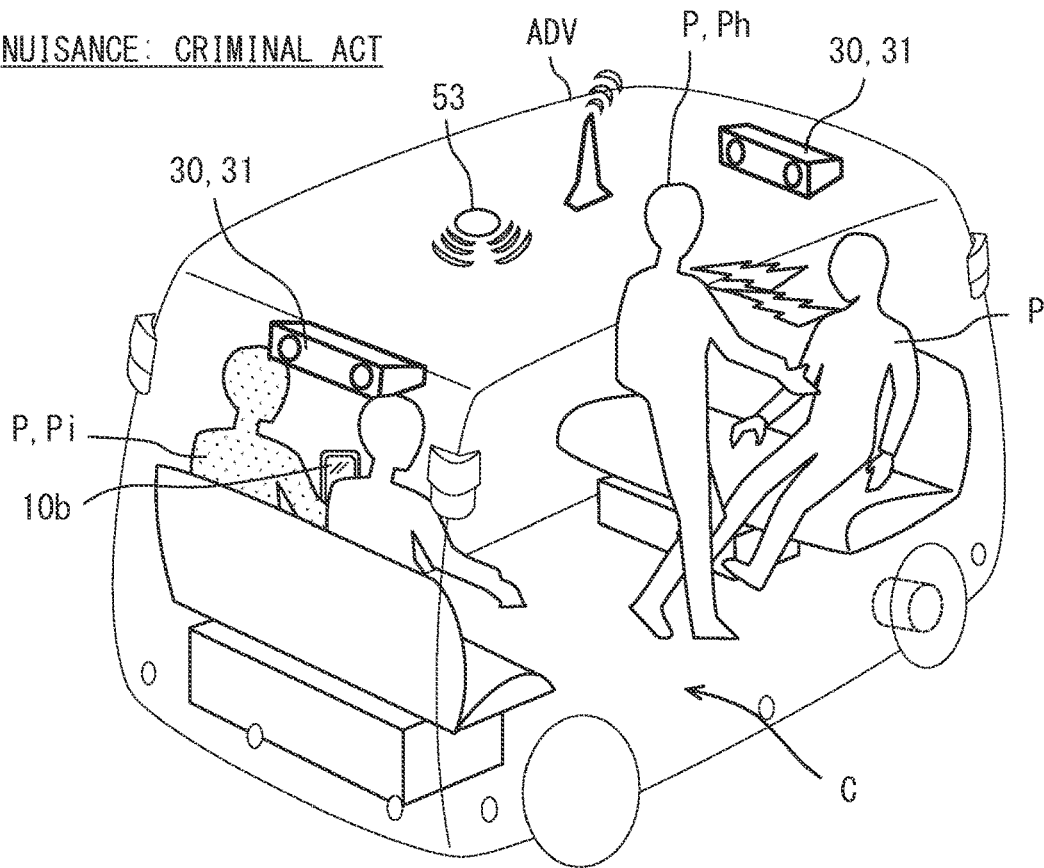
NUISANCE: CRIMINAL ACT
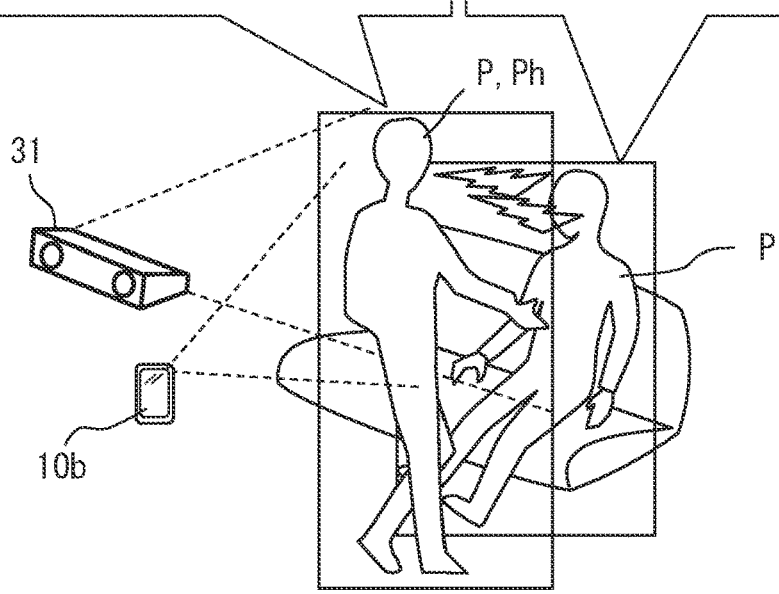
TARGET: 11112
COORDINATES: X, Y
CATEGORY: PASSENGER ID 000XXX
ATTRIBUTE: ORDINARY PEOPLE
(I.E., NOT-PRIORITIZED)
TARGET: 11111
COORDINATES: LEFT SIDE IN REAR SEAT
CATEGORY: PASSENGER ID 000XXX
ATTRIBUTE: ORDINARY PEOPLE
(I.E., NOT-PRIORITIZED)

US 11,254,318 B2

PASSENGER COMPARTMENT MONITORING METHOD AND PASSENGER COMPARTMENT MONITORING DEVICE

CROSS REFERENCE TO RELATED APPLICATION

The present application is a continuation application of International Patent Application No. PCT/JP2019/018476 filed on May 9, 2019, which designated the U.S. and claims the benefit of priority from Japanese Patent Application No. 2018-120955 filed on Jun. 26, 2018. The entire disclosures of all of the above applications are incorporated herein by reference.

TECHNICAL FIELD

The present disclosure relates to a technology for monitoring a passenger compartment of a vehicle where a passenger gets on.

BACKGROUND

Conventionally, for example, in each vehicle such as a train, when information about a criminal act such as molestation is transmitted from a mobile phone carried by a passenger, a train car alarm system provides to control a predetermined alarm device to display and announce a warning in a train car. In the train car alarm system, a predetermined message using a sound output device is announced to all passengers who board the train car.

SUMMARY

A passenger compartment of a vehicle, on which a plurality of passengers are boarded, is monitored. An individual presentation device for providing individual notification to each of the passengers is associated with each of the passengers boarding the passenger compartment. One of the passengers who is an actor of a predetermined specific action is specified. The actor is requested to stop the specific action using the individual presentation device associated with the actor.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram illustrating a scene in which a bad manner action is occurring;

FIG. 3 is a diagram illustrating a scene in which an action leading to a crime is occurring;

DETAILED DESCRIPTION

Figure 1:
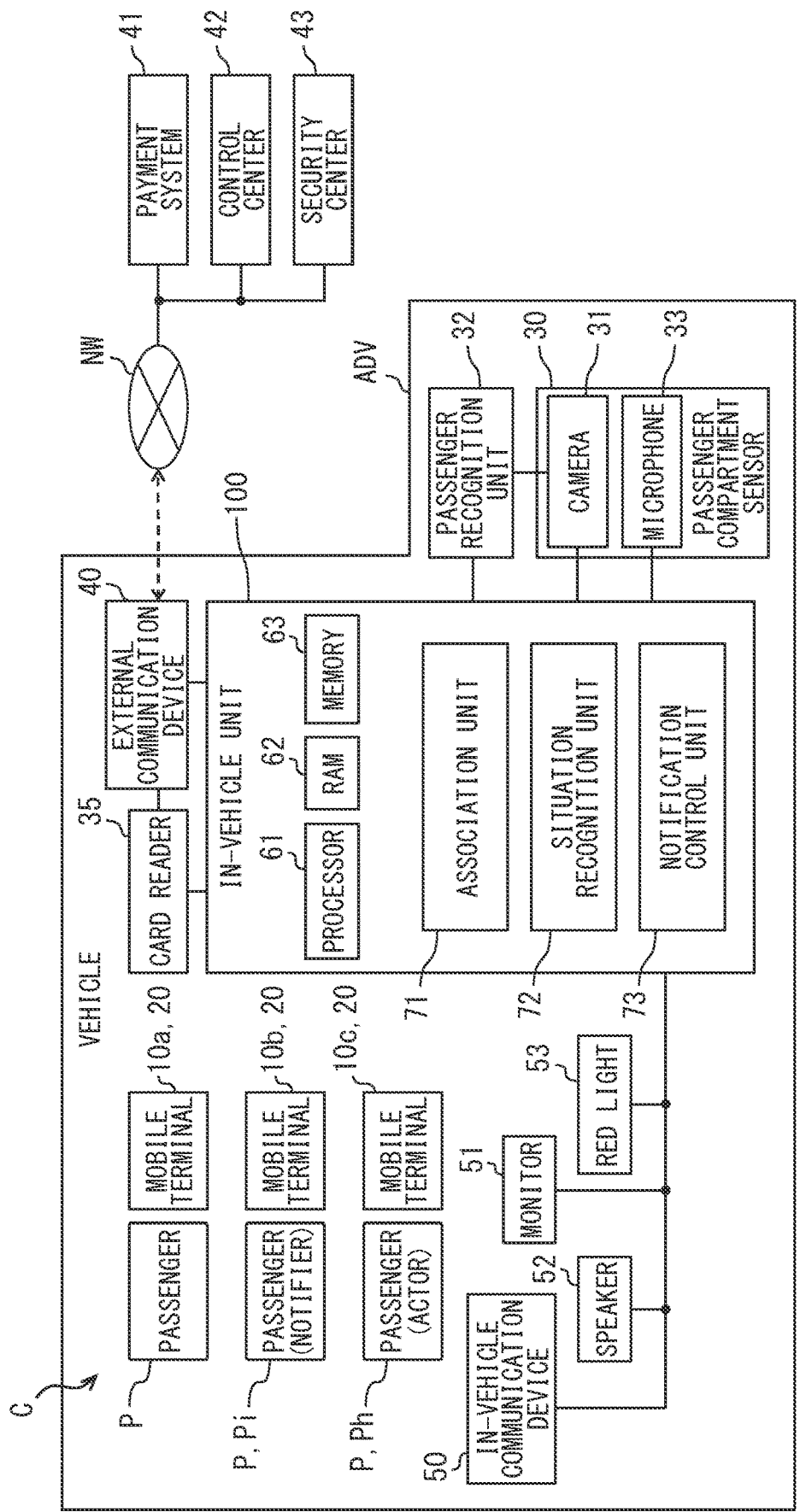
FIG. 1 is a block diagram showing an overview of a system including an in-vehicle unit according to a first embodiment of the present disclosure.

In a passenger compartment of a vehicle, an act that is not a criminal act but is considered as annoying act on other passengers may frequently occur. When the suspension of such an action is announced to all passengers by a voice message similar to the conceivable train car alarm system, the action can be suppressed, but the announcement that may occur frequently bothers many passengers.

The present embodiments provide a passenger compartment monitoring method and a passenger compartment monitoring device that can suppress botheration attributed to a cancellation request and can restrict a particular act to ensure the comfort of a passenger compartment.

In the present embodiments, a passenger compartment monitoring method, for monitoring a passenger compartment of a vehicle where a plurality of passengers get on, which is implemented by a computer, causes at least one processor to: connect an individual presentation device for individually notifying with respect to each passenger with each passenger who boards the passenger compartment; specify one of the passengers as an actor of a predetermined specific action; and request the actor to stop the specific action through the individual presentation device associated with the actor.

In the present embodiments, a passenger compartment monitoring device mounted on a vehicle and monitoring a passenger compartment of the vehicle in which a plurality of passengers board includes: an association unit that connects an individual presentation device for individually notifying with respect to each passenger with each passenger who boards the passenger compartment; an action identification unit that specifies one of the passengers as an actor of a predetermined specific action; and a notification control unit that requests the actor to stop the specific action through the individual presentation device associated with the actor.

In the present embodiments, a passenger compartment monitoring device, which is mounted on a vehicle and monitors a passenger compartment of the vehicle on which a plurality of passengers board, includes a processor. The processor connects an individual presentation device for individually notifying with respect to each passenger with each passenger who boards the passenger compartment; specifies one of the passengers as an actor of a predetermined specific action; and requests the actor to stop the specific action through the individual presentation device associated with the actor.

In these aspects, when an actor of a predetermined specific act is identified, one of the individual presentation devices associated with the actor among the individual presentation devices individually associated with each passenger can request to stop the specific action. Therefore, the presentation of the request to stop the specific action is unlikely to bother the passengers other than the actor. According to the above, it is possible to suppress the botheration related to the stop request and restricts the specific action. Therefore, the comfort of the passenger compartment is secured.

Hereinafter, multiple embodiments of the present disclosure will be described with reference to the drawings. Incidentally, the same reference numerals are assigned to corresponding components in each embodiment, and therefore duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. It should be understood that the unexplained combinations of the structural components recited in the following embodiments and modifications thereof are assumed to be disclosed in this description by the following explanation.

First Embodiment

The function of the passenger compartment monitoring device according to the first embodiment of the present disclosure is realized by the in-vehicle unit 100 shown in FIG. 1. The in-vehicle unit 100 is an in-vehicle computer mounted on the vehicle ADV. The vehicle ADV shown in FIGS. 1 and 2 is an automatic driving bus that can autonomously travel without a driver's driving operation, and is a connected car that can communicate with a communication network NW outside the vehicle. The vehicle ADV includes, for example, a passenger compartment C in which a predetermined numerical number of passengers P (for example, several passengers to several tens passengers) can board. In the passenger compartment C, a large number of seats on which passengers P are seated are installed.

A passenger compartment sensor 30, a passenger recognition unit 32, a card reader 35, an external communication device 40, an in-vehicle communication device 50, a monitor 51, a speaker 52, a red light 53, and the like are mounted on the vehicle ADV together with the in-vehicle unit 100.

The passenger compartment sensor 30 is a sensor for grasping the situation of the passenger P in the passenger compartment C. A plurality of passenger compartment sensors 30 are arranged on the ceiling of the passenger compartment C, for example, and include a camera 31 and a microphone 33. The camera 31 photographs the passenger compartment C and the passenger P, and sequentially outputs the generated passenger compartment image to the passenger recognition unit 32 and the in-vehicle unit 100. The camera 31 is combined with a wide-angle lens, and is disposed in a passenger compartment at a position where the camera 31 has no blind spot. The camera 31 may have a configuration capable of detecting light in the near infrared region in addition to light in the visible light region, or may be combined with a laser scanner or the like. The microphone 33 sequentially outputs the passenger compartment sound which includes the sound of the passenger compartment C detected toward the in-vehicle unit 100. The microphone 33 can collect the sound of a conversation between passengers P, for example.

The passenger recognition unit 32 analyzes the passenger compartment image generated by the camera 31 and recognizes the situation of each passenger P. The passenger recognition unit 32 can grasp the posture of each passenger P and actions such as movement, sitting and leaving actions. Specifically, the passenger recognition unit 32 detects a target such as the passenger P and an object (e.g., a large luggage, etc.) from the passenger compartment image, and tags the recognized target with a coordinate, a category, and the like. Information such as the right side of the front seat, the left side of the rear seat, and coordinates (X, Y) is input to the coordinate item. Information such as a large package and an individual passenger ID is entered in the category item. The passenger recognition unit 32 sequentially outputs the detection information including the target number, the coordinates, the category, etc. to the in-vehicle unit 100.

The card reader 35 is installed, for example, near the doorway of the passenger compartment C. The card reader 35 is a device capable of near field communication (i.e., NFC) between the transportation card and the mobile terminals 10a to 10c having the card function. The card reader 35 receives terminal-specific identification information (hereinafter, "terminal ID") from each transportation card and each mobile terminal 10a to 10c. The card reader 35 is connected to the payment system 41 via the external communication device 40 outside the vehicle and the communication network NW. When the passenger P holds the transportation card or the mobile terminal 10a to 10c over the card reader 35, the usage charge of the vehicle ADV (for mobility service) is settled in real time based on the terminal ID read by the card reader 35. The card reader 35 can provide the attribute information of each passenger P, stored in the transportation card or the mobile terminals 10a to 10c, or the payment system 41, to the passenger compartment unit 100 or the like.

The external communication device 40 can wirelessly communicate with the external communication network NW outside the vehicle. In addition to the payment system 41 described above, the communication network NW is connected with a system of an operation management center for the vehicle ADV (hereinafter, "a management center 42"), a security company system (hereinafter, "a security center 43"), and the like. The external communication device 40 transmits and receives information to and from the payment system 41, the management center 42, and the security center 43.

The in-vehicle communication device 50 can transmit and receive information to and from the mobile terminal 10a to 10c brought into the passenger compartment C by the passenger P by wireless communication in accordance with the Bluetooth (registered trademark) standard, for example. The in-vehicle communication device 50 can individually send a message to each of the mobile terminals 10a to 10c. The in-vehicle communication device 50 may be connected to each of the mobile terminals 10a to 10c by a communication standard different from Bluetooth, such as a wireless LAN.

The monitor 51, the speaker 52, and the red light 53 are installed in the passenger compartment and present the information to the passenger P in the passenger compartment C. The monitor 51 is, for example, a liquid crystal display or the like, and displays advertisements, news, operation information of the vehicle ADV, attention information, etc. on the screen. The speaker 52 reproduces a voice message for the passenger P in the passenger compartment. The red light 53 is arranged, for example, in the central portion of the ceiling of the vehicle ADV (see FIG. 3). The red light 53 blinks when a nuisance act (such as a criminal act) described later occurs, and notifies the passenger P of the occurrence of an emergency or an abnormal situation.

The in-vehicle unit 100 shown in FIG. 1 monitors the passenger P who is boarding in the passenger compartment C, and performs a control for maintaining order in the vehicle. The function of the in-vehicle unit 100 includes a function for performing the roles of the driver and the conductor in a manned vehicle and a manned railway vehicle. The in-vehicle unit 100 handles an occurrence of a bad manner nuisance act as a slight nuisance act, an act that may cause a crime as a serious nuisance act (hereinafter referred to as "a criminal act"), and an injured person and a sudden sick person (hereinafter referred to as "a rescue required person").

Specifically, the nuisance act detected as a violation of manners includes loud voice conversations, mobile phone calls, stains on the passenger compartment C, sound leakage from earphones and headphones, and occupation of seats with a large luggage as shown in FIG. 2. In addition, the nuisance act detected as a criminal act includes, for example, destruction of vehicle equipment, molester, theft, and abuse and violence against other passengers P as shown in FIG. 3.

In order to realize the above-mentioned watching function and the order maintenance function, the in-vehicle unit 100 shown in FIG. 1 includes mainly a control circuit having a processor 61, a RAM 62, a memory device 63, and an input/output interface. The processor 61 is hardware for arithmetic processing and connected to the RAM 62, and can execute various programs. The memory device 63 includes a non-volatile storage medium, and stores various programs to be executed by the processor 61. The programs stored in the memory device 63 include at least a passenger compartment monitoring program that causes the in-vehicle unit 100 to perform the above-described passenger compartment monitoring function. By the execution of the passenger compartment monitoring program by the processor 61, the in-vehicle unit 100 is equipped with functional units such as the association unit 71, the situation recognition unit 72, and the notification control unit 73.

Figure 4:
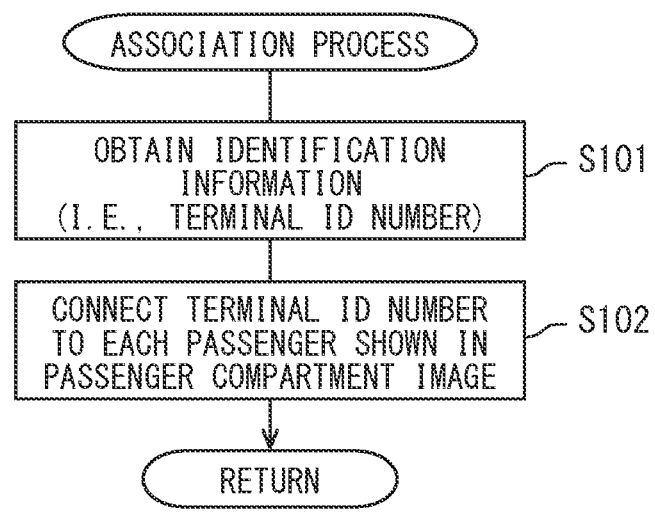
FIG. 4 is a flowchart showing details of a process of associating each passenger in the passenger compartment with a mobile terminal as an individual presentation device.

The association unit 71 associates the mobile terminals 10a to 10c, which are respectively carried by the passengers P, to the passengers P who are boarding in the passenger compartment C, respectively, on the data by the associating process (see FIG. 4). Through such association processing, each of the mobile terminals 10a to 10c is registered as an individual presentation device 20 capable of individual notification to the individual passenger P who is the owner of the individual presentation device 20.

More specifically, the association unit 71 respectively acquires the terminal IDs of the mobile terminals 10a to 10c through the card reader 35 when the passengers P board the vehicle ADV and pay the charges with the mobile terminals 10a to 10c (at S101 in FIG. 4). At this time, the association unit 71 individually grasps the passenger P shown in the passenger compartment image based on the detection information acquired from the passenger recognition unit 32. The association unit 71 refers to the timing at which the terminal IDs of the mobile terminals 10a to 10c are acquired, the attribute information of the passengers P, and the like, and associates the terminal IDs of the mobile terminals 10a to 10c with the passengers P (using the target number or the passenger ID) shown in the passenger compartment image (at S102 in FIG. 4). The association unit 71 maintains the state in which the mobile terminals 10a to 10c are linked to the passengers P at least until the passengers P get off.

Further, the association unit 71 can add the information of the item of the attribute (whether it is a priority person or the like) to each target based on the attribute information acquired from the card reader 35, the passenger compartment image, and the like. For example, a passenger P who is an elderly person indicated by the attribute information is registered as a prioritized person. Further, when the passenger P using the white cane WC is detected (see FIG. 2), the passenger P is registered as a prioritized person. Further, the target such as luggage may be associated with the passenger ID indicating the owner of the luggage.

The situation recognition unit 72 recognizes the situation of the passenger compartment C, and specifies a presumed specific action, that is, the above-mentioned manner violation action and criminal action, and identifies the passenger P who is the actor Ph of the action. The situation recognition unit 72 provides a passenger watching system together with the passenger compartment sensor 30, the passenger recognition unit 32, and the like.

The situation recognizing unit 72 combines the detection information of the passenger compartment sensor 30 and the occurrence notification transmitted from the passenger P who is boarding the passenger compartment C and identifies the nuisance action and the like and certifies the actor Ph. More specifically, in addition to the detection information of the camera 31 analyzed by the passenger recognition unit 32, the situation recognition unit 72 acquires the passenger compartment sound output from the microphone 33 and the passenger compartment image output from the camera 31. The situation recognition unit 72 preliminarily excludes private information in advance from the conversation content included in the passenger compartment sound, and grasps the tone, volume, sound range, and conversation speed, and at the same time grasps the behavior (e.g., gesture, etc.) of the passenger P in the passenger compartment image. The situation recognition unit 72 estimates the content of the nuisance act and the actor Ph by combining these pieces of information thus grasped. Analysis of the passenger compartment sound and the passenger compartment image may be performed statistically and stochastically using AI (Artificial Intelligence) technology.

On the other hand, the occurrence notification is transmitted to the in-vehicle unit 100 by the passenger P (i.e., the notifier Pi) who discovers the nuisance act in the passenger compartment C. When the notifier Pi discovers a nuisance in the passenger compartment C, the notifier Pi can transmit the occurrence notification using the mobile terminal 10b, the user terminal installed in the vehicle ADV, a notification button, and the like.

Figure 6:
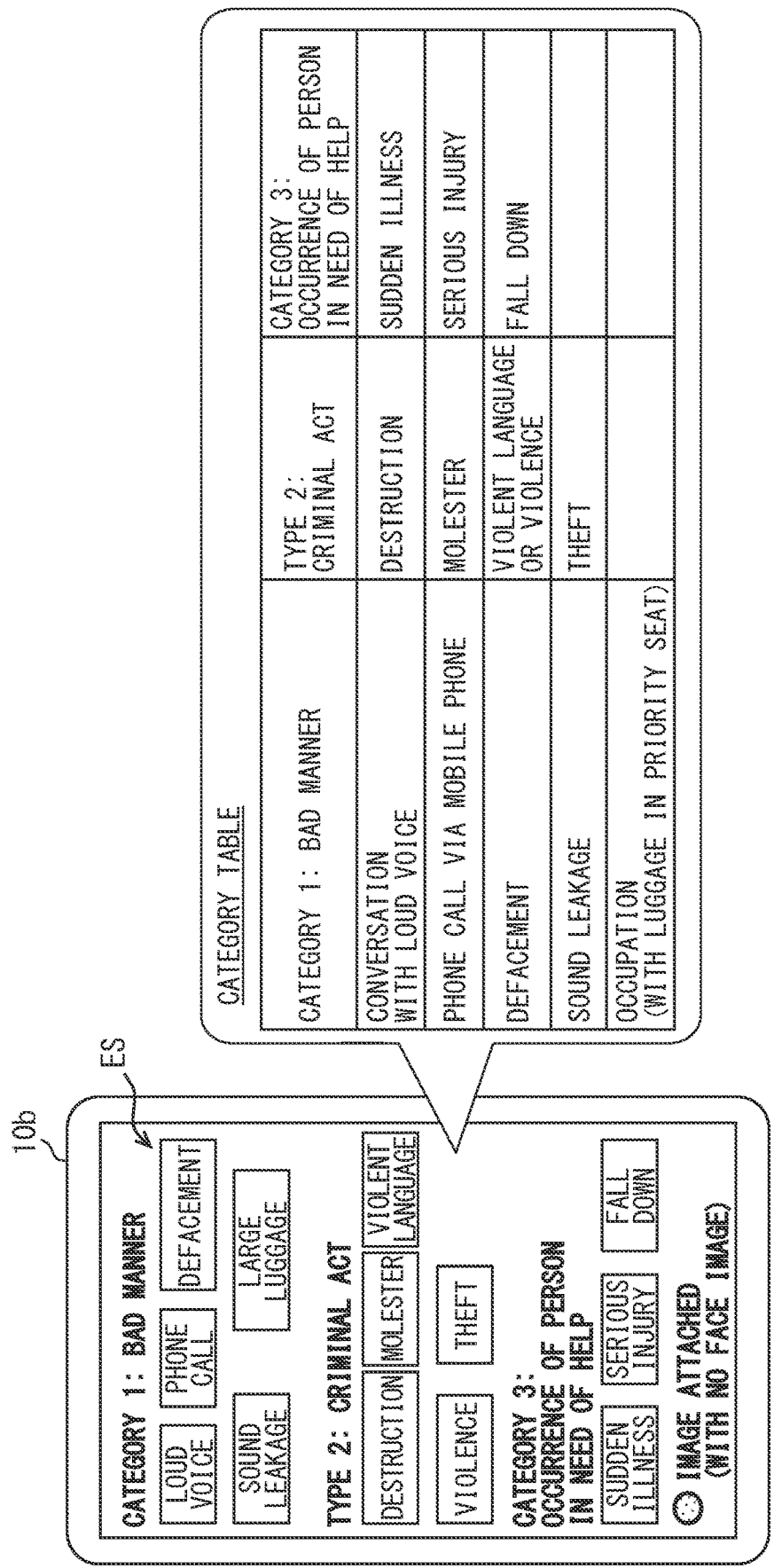
FIG. 6 is a diagram showing an example of the first half of an occurrence notification input screen displayed on the display of a mobile terminal.
Figure 7:
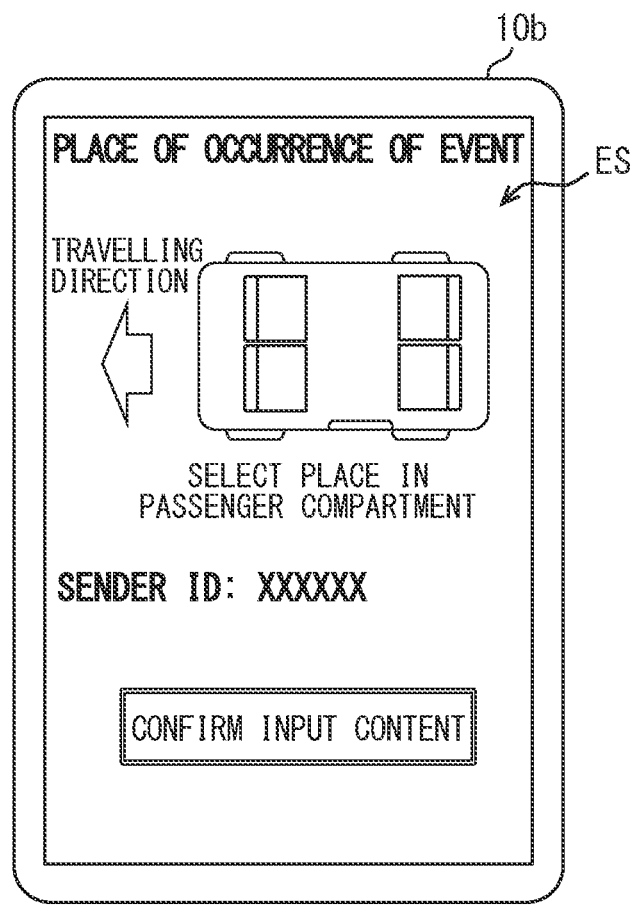
FIG. 7 is a diagram showing an example of the second half of the input screen.

To describe the transmission process of the occurrence notification in detail, the notifier Pi activates the nuisance notification application by tapping the icon IC of the nuisance notification application installed in advance on the personal mobile terminal 10b. The nuisance notification application requests the notifier Pi to input the type of nuisance and the position of the actor Ph and to attach a site photograph (i.e., still image or video) of the nuisance act (see FIGS. 6 and 7). Here, the attachment of the on-site photograph may be optional.

Figure 5:
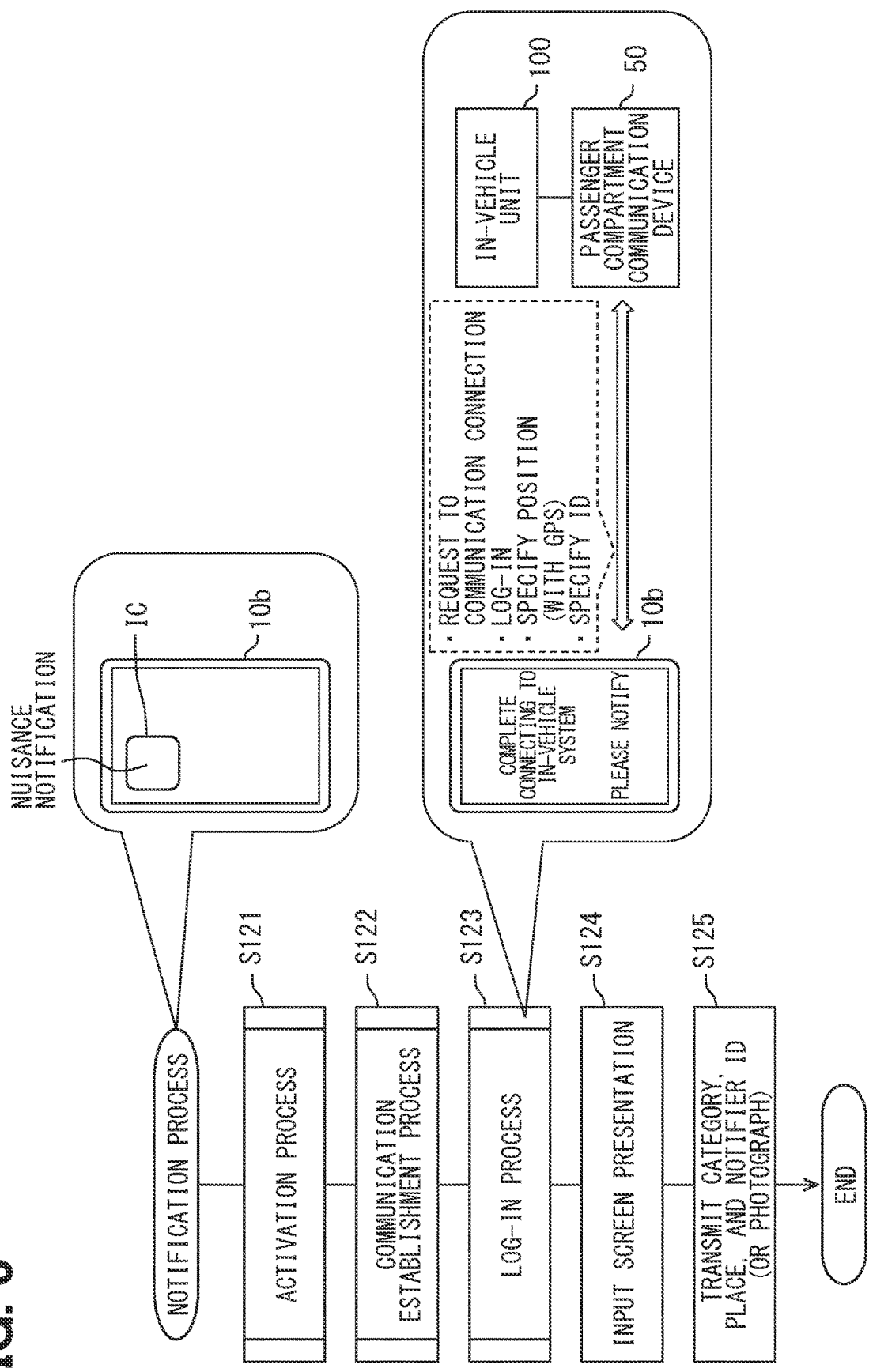
FIG. 5 is a flowchart showing details of notification process executed by a mobile terminal for transmission of an occurrence notification.

In response to the tap operation of the icon IC, the mobile terminal 10b starts the notification process shown in FIG. 5 and executes the nuisance notification application activation process (S121). In response to a request for communication connection to the in-vehicle communication device 50, the mobile terminal 10b establishes communication with the in-vehicle unit 100 by Bluetooth or the like (S122), and executes a login processing to the in-vehicle unit 100 (S123). In the login process, the GPS information, the terminal ID, etc. are transmitted from the mobile terminal 10b to the in-vehicle unit 100. The in-vehicle unit 100 permits the login operation of the mobile terminal 10b based on the position information of the mobile terminal 10b and the identification of the terminal ID.

After logging in to the in-vehicle unit 100, the mobile terminal 10b presents the input screen ES (see FIGS. 6 and 7) on the display (S124). The input screen ES requests the notifier Pi to select the type of nuisance or the like, to attach a on-site image, and to input the occurrence location of the nuisance act. The type of nuisance, etc. is preliminarily classified into items such as manner violations, crimes, and occurrence of persons requiring help (see the list in FIG. 6). On the input screen ES, selection buttons for nuisance or the like included in each item are displayed in a list.

The notifier Pi selects a trouble that is actually occurring in the passenger compartment C by tapping the selection button displayed on the input screen ES. Further, the notifier Pi can use the camera 31 of the mobile terminal 10b to attach a site photograph of a nuisance or the like as an evidence (see FIG. 3). In addition, the notifier Pi selects the place where the nuisance or the like has occurred on the selection screen showing a schematic diagram of a floor plan of the passenger compartment C (see FIG. 7).

When the input to the input screen ES by the notifier Pi is completed, the mobile terminal 10b transmits the type of nuisance, the position of the actor Ph, the site photograph, the notifier ID (i.e., the terminal ID of the notifier Pi), and the like as the occurrence notification to the in-vehicle unit 100 (S125), and the notification process ends. The passenger P who does not have a mobile terminal may be able to input each of the above-mentioned information by the above-mentioned user terminal in the vehicle.

After transmitting the above occurrence notification, the notifier Pi is requested by the in-vehicle unit 100 to determine whether the nuisance or the like has disappeared. The notifier Pi can transmit to the in-vehicle unit 100 the end notification of the previously-announced nuisance act by operating the mobile terminal 10b or the in-vehicle user terminal. It is desirable that such an end notification can be transmitted by a simple operation such as only one tap operation.

When the content of the detection information of the camera 31 and the content of the notification of occurrence from the notifier Pi match, the situation recognition unit 72 shown in FIG. 1 identifies the nuisance act or the like and specifies the actor Ph. Specifically, when the situation recognition unit 72 receives the occurrence notification from the notifier Pi, the situation recognition unit 72 analyzes the passenger compartment image and the passenger compartment sound around the occurrence position of the nuisance act or the like based on the position information indicated by the occurrence notification. When it is determined that the content of the act recognized from the passenger compartment image and the passenger compartment sound matches the notified content with a high probability (that is, the matching score exceeds the threshold), the situation recognition unit 72 certifies the occurrence of the nuisance act or the like. In addition, the situation recognition unit 72 can determine the end of the nuisance act or the like based on the end notification from the notifier Pi who inputs the occurrence notification.

When the situation recognition unit 72 determines that the nuisance act or the like has occurred, the notification control unit 73 performs actuation according to the type of the nuisance act or the like that is occurring. Specifically, the notification control unit 73 appropriately performs etiquette notifications and warnings to the actor Ph, notifications to the management center 42, the security center 43, police agencies, and the like, and storage of the passenger compartment images, the passenger compartment sounds, and the like. The notification control unit 73 constructs an in-vehicle order maintenance system together with the passenger watching system described above and the components (50 to 53) for actuation.

When the manner violation has occurred, the notification control unit 73 uses the mobile terminal 10c associated with the actor Ph as the individual presentation device 20 to request the actor Ph to cancel the manner violation. For example, when a manner violation is detected, a notification message prepared in advance is presented to the actor Ph by the mobile terminal 10c. Specifically, the phrase such as "Please refrain from talking on the phone in the car. Thank you for your cooperation" or "Please turn down the volume of the phone call to be thoughtful of others" or "Please pay attention to the sound leakage from the mobile phone" or the like is displayed on the mobile terminal 10c. When the user wears earphones or the like, the cancellation request may be presented by a voice message.

As described above, the notification control unit 73 requests the notifier Pi to confirm whether or not the manner violation is improved. When the situation recognition unit 72 recognizes that the nuisance act has been terminated based on the notification of termination by the notifier Pi, the notification control unit 73 ends the cancellation request of the manner violation action using the mobile terminal 10c (i.e., the individual presentation device 20). Then, the notification control unit 73 displays a message such as "Thank you for your cooperation" on the display of the terminal. According to such a process, it is possible to prevent an increase in annoyance due to the continuation of unnecessary notification.

On the other hand, when a criminal act has occurred, the notification control unit 73 changes the method of requesting cancellation to the actor Ph from the case of a manner violation. The notification control unit 73 uses the speaker 52 and the red light 53 to directly request the actor Ph to stop the criminal action.

Further, when the person requiring rescue is generated, the notification control unit 73 uses the speaker 52 or the like to ask other passengers P around the person requiring rescue with a rescue request from the person requiring rescue. Further, the notification control unit 73 establishes a state that the operator of the management center 42 can communicate with the notifier Pi so that the situation inside the vehicle can be confirmed by the image or the sound. From the above, important decisions are made by the external operator.

Figure 8:
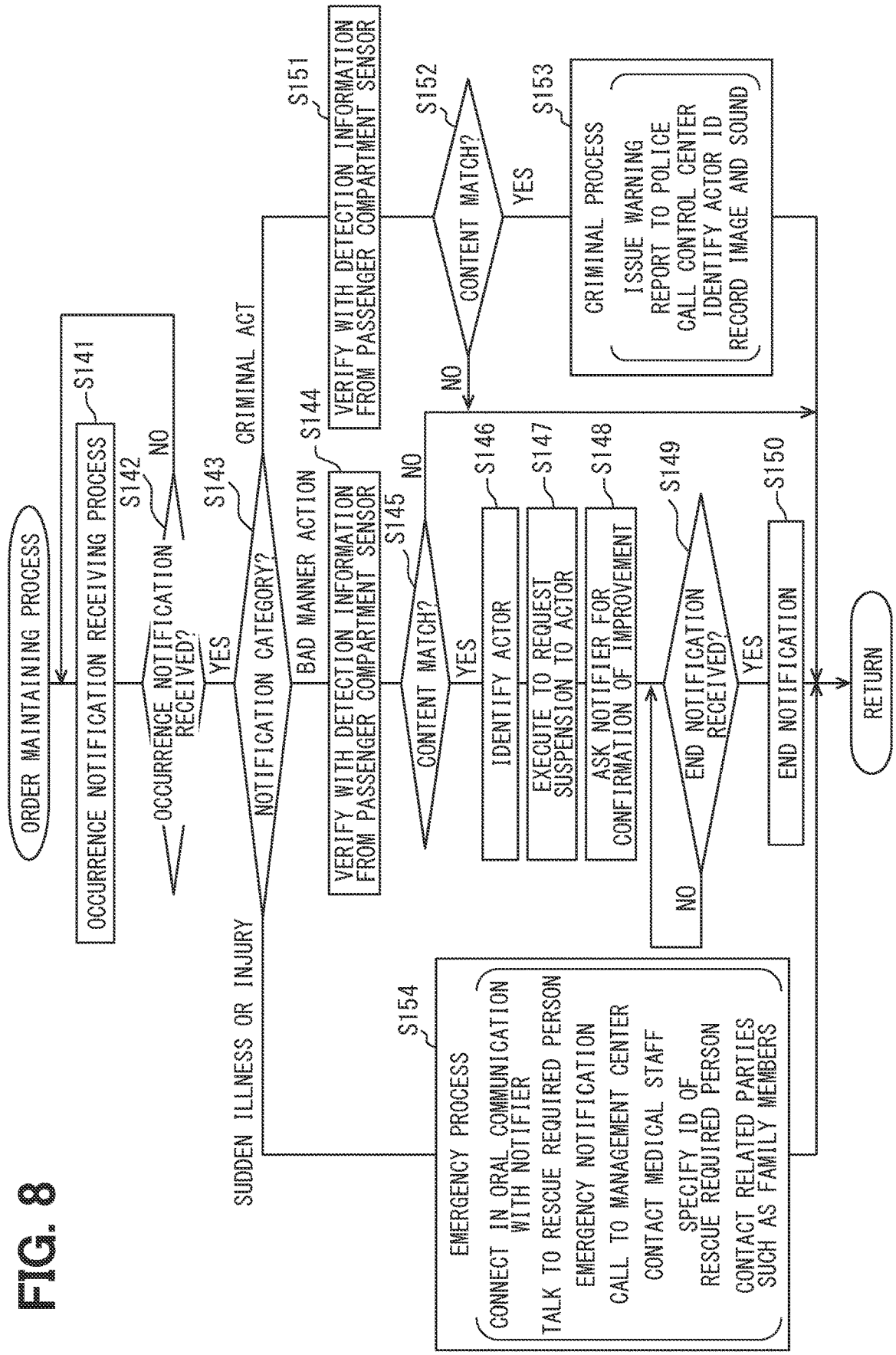
FIG. 8 is a diagram showing details of order maintenance process carried out by an in-vehicle unit.

Details of the order maintenance processing executed by the in-vehicle unit 100 will be described based on FIG. 8 and with reference to FIG. 1 and the like. The order maintenance process shown in FIG. 8 is started based on the activation of the traveling system of the vehicle ADV, and is continued until the traveling system is turned off.

In S141, a reception process of the occurrence notification is performed, and the process proceeds to S142. In S142, it is determined whether or not the occurrence notification in S141 is received. By repeating steps S141 and S142, the reception of the occurrence notification is awaited, and when the occurrence notification is transmitted from the notifier Pi, the process proceeds from S142 to S143.

In S143, the type of the occurrence notification received in S141 is determined. In S143, when the occurrence notification is the content of notifying the manner violation, the process proceeds to S144. In S144, the content of the occurrence notification is verified with the content of the detection information of the passenger compartment sensor 30, and the process proceeds to S145. In S145, as a result of the verification in S144, it is determined whether or not the contents of the occurrence notification and the detection information are consistent. When it is determined in S145 that the contents of each information do not match, it is estimated that the occurrence notification is an error notification or a mischief notification, and the order maintenance process is temporarily terminated. In this case, for example, a message may be displayed on the monitor 51 of the passenger compartment C without specifying the actor Ph and only actuation for all passengers may be performed.

On the other hand, when it is determined in S145 that the contents of each information match, the process proceeds to S146. In S146, the actor Ph of the nuisance act is identified based on the position information of the actor Ph indicated in the notification of occurrence and the analysis result of the passenger compartment image, and the process proceeds to S147. In S147, the individual presentation device 20 (i.e., the mobile terminal 10c) associated with the actor Ph certified in S146 is used to request cancellation of the nuisance act, and the process proceeds to S148. The message may be displayed on the monitor 51 before the cancellation request is issued by the individual presentation device 20. In this case, it is desirable that the voice notification using the speaker 52 may not be carried out because other passengers P may feel bothersome.

In S148, the notification person Pi is requested to confirm the improvement of the nuisance act through the mobile terminal 10b, and the process proceeds to S149. In step S149, it is determined whether or not the termination notification from the notification person Pi has been received, so that the reception of the termination notification is awaited. When it is determined in S149 that the termination notice has been received, the process proceeds to S150. In S150, the cancellation request to the actor Ph using the individual presentation device 20 is terminated, and the order maintenance process is terminated.

On the other hand, when the occurrence notification has the content of notifying a criminal act, the process proceeds to S151. In S151 and S152, similarly to S144 and S145, the content of the occurrence notification and the content of the detection information of the passenger compartment sensor 30 are compared to determine whether or not the contents of the occurrence notification and the detection information match each other. When the information does not match, for example, the actor Ph is not specified, and only the attention is directed to the entire passenger compartment, such as displaying a message on the monitor 51, and the order maintenance process ends.

On the other hand, when it is determined in S152 that the contents of the occurrence notification and the detection information match, the process proceeds to S153. In S153, a criminal process is executed. Specifically, in criminal processing, an alarm is issued to the passenger compartment C, and a call to the management center 42, a notification to the police agency and the security center 43, identification of the actor Ph, recording of a passenger compartment image and passenger compartment sound around the actor Ph and so on are performed.

When the occurrence notification has the content of notifying the passenger P of the injury or sudden illness, the process proceeds to S154 of FIG. 8. In S154, emergency processing is executed. Specifically, in the emergency process, a call to the management center 42, the voice communication connection between the operator of the management center 42 and the notifier Pi, a call to the person requiring rescue, identification of ID information of the person requiring rescue, and contact related parties such as family members, reporting to emergency departments, and contact medical personnel and the like are performed.

A specific example of order-maintaining actuation based on the above processing will be described with reference to FIGS. 1 and 8 along with the scenes of FIGS. 2 and 3.

In the scene of manner behavior violation shown in FIG. 2, the in-vehicle unit 100 receives the notification of occurrence from the notifier Pi who discovers that the large baggage occupies the seat (at S141), and also occupation of the seat with the large baggage is detected based on the passenger compartment image (at S144, S145). As a result, the in-vehicle unit 100 recognizes the owner of the large-sized luggage as the actor Ph for the manner violation (at S146). When the seat occupied by the large baggage is the priority seat, the in-vehicle unit 100 can also specify the situation that the priority person cannot sit down and the situation that the ordinary person (i.e., the non-priority person) uses the priority seat.

The in-vehicle unit 100 requests the actor Ph to cancel, so that the message such as "please put your luggage on your knees when the vehicle is crowded so that even one person can sit down the seat" or "please give up your seat to the priority person" is displayed on the display of the mobile terminal 10c of the actor Ph (at S147).

Then, when the seat release is detected from the passenger compartment image, or when the termination notification with respect to the improvement confirmation request is sent to the notification person Pi, the notification by the mobile terminal 10c is terminated and the message such as "thank you for your cooperation in the in-vehicle manners" is displayed (at S150).

On the other hand, in the crime scene shown in FIG. 3, the in-vehicle unit 100 receives the notification of the occurrence by the notifier Pi who has encountered the passenger P's abuse or violence (at S141). Then, when abusive language and violence are detected from the passenger compartment image and the passenger compartment sound (at S144, and S145), the in-vehicle unit 100 identifies the occurrence of a criminal act having a high criminality and issues a warning in the vehicle. For example, the blinking of the red light 53 and the reproduction of the voice message such as "the criminal activity is suspected. The inside of the car is recorded. We will notify the police. The staff rushes." by the speaker 52 are sequentially executed. Furthermore, the in-vehicle unit 100 stores the ID information (i.e., the terminal ID and/or passenger ID) of the actor Ph in association with the passenger compartment image, the site photograph, and the like, and transmits at least a part of these data to the management center 42 and the security center 43.

As a result, the emergency dispatcher associated with the management center 42 can rush to the site and take measures such as protecting the victim. Further, since the actor Ph is specified, it becomes possible for the police agency to perform optional questioning to the actor Ph.

As described above, in the passenger compartment monitoring method of the first embodiment implemented in the in-vehicle unit 100, each mobile terminal 10b is individually associated with each passenger P as the individual presentation device 20. Therefore, when the actor Ph of the nuisance or the like is authorized, the actor Ph is requested to stop the nuisance act through the individual presentation device 20 (i.e., the mobile terminal 10c) associated with the actor Ph. Therefore, the presentation of the request for terminating the nuisance does not bother the passengers P other than the actor Ph. According to the above, it is possible to suppress the botheration related to the stop request and restricts the nuisance action. Therefore, the comfort of the passenger compartment C is easily ensured.

In addition, in the first embodiment, the occurrence of the nuisance and the actor Ph are authorized based on the occurrence notification from the passenger P who is boarding the passenger compartment C. Therefore, annoying acts that other passengers P feel as annoying around the actor Ph are likely to be the target of alerting by the order maintenance system. Therefore, the comfort of the passenger compartment C can be ensured with high certainty.

Further, in the first embodiment, when the content of the detection information of the passenger compartment sensor 30 matches the content of the occurrence notification, the occurrence of the nuisance and the actor Ph are recognized. That is, the alert notification for the specific passenger P is not performed only by the occurrence notification. As described above, when the nuisance actor Ph can be identified with high accuracy, it becomes difficult for a request for stopping improper content issues, a request for terminating to the wrong passengers P, and the like to transmit.

Further, the in-vehicle unit 100 of the first embodiment can acquire the terminal ID of the mobile terminal 10b that has transmitted the occurrence notification together with the occurrence notification. In this way, with the system configuration in which the information that can identify the notifier Pi of the occurrence notification remains, the transmission of the occurrence notification by mischief can be reduced. As a result, it is possible to suppress the execution of an erroneous termination request, and thus it becomes difficult for the introduction of the order maintenance system to impair the comfort of the passenger compartment C.

In addition, in the first embodiment, the termination request to the actor Ph is terminated based on the termination notification by the notifier Pi who has input the occurrence notification. Based on the above, a situation where a troublesome alert is continued due to a slight nuisance act is avoided. As a result, it is difficult for the well-meaning actor Ph who has inadvertently been subject to the termination request to feel uncomfortable.

Further, in the first embodiment, the method of requesting termination to the actor Ph is changed according to the type of nuisance or the like. By including such steps, it becomes possible to improve the situation without annoying the passengers P in the surroundings by individually calling attention to a slight nuisance act such as a bad manner. On the other hand, for severe nuisances that are suspected of being criminal, it is possible to give priority to quick situation improvement by performing a strong alert.

In the first embodiment, the situation recognition unit 72 corresponds to the "the action identification unit", and the in-vehicle unit 100 corresponds to the "computer".

Second Embodiment

Figure 9:
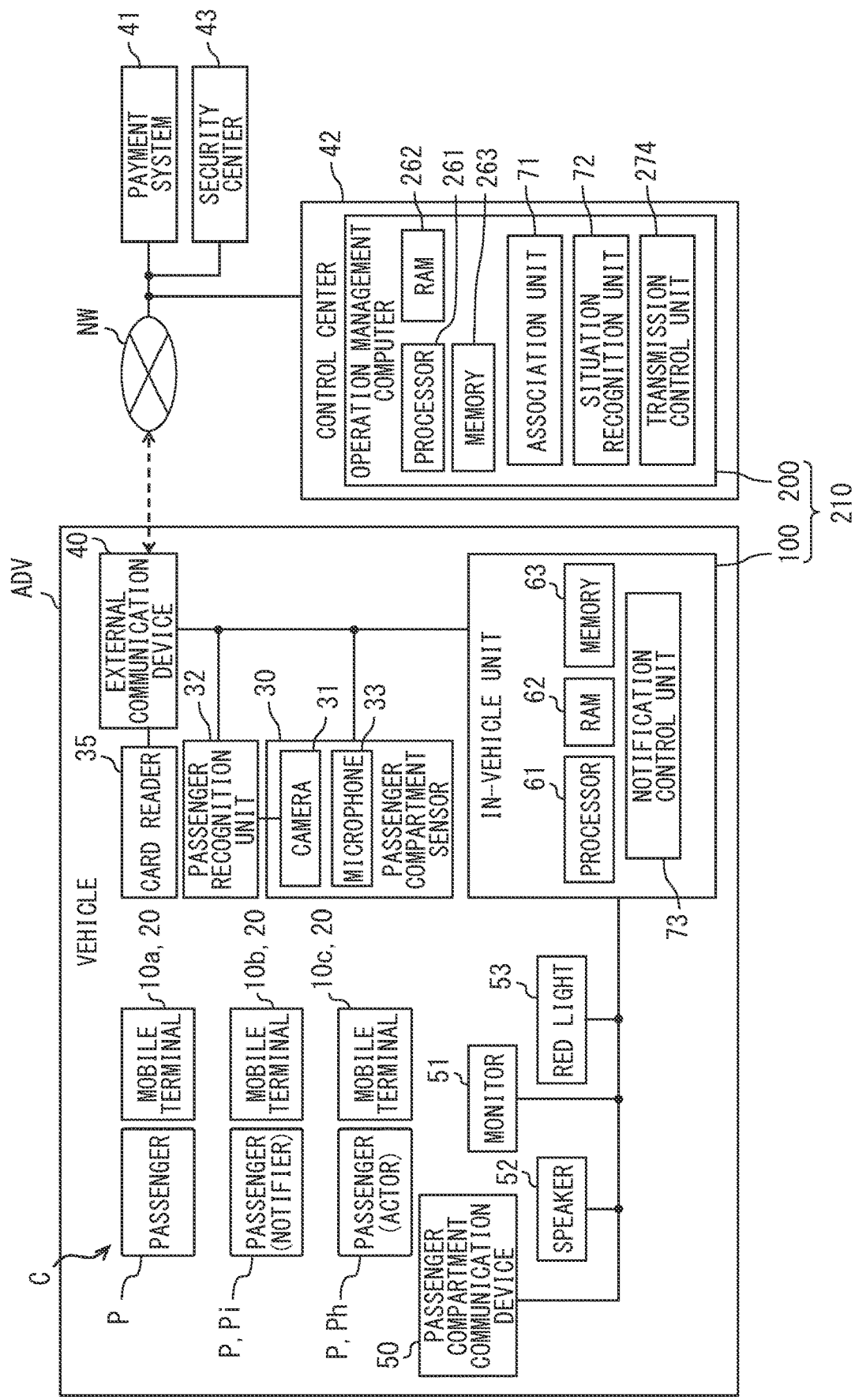
FIG. 9 is a block diagram showing an overview of a passenger compartment monitoring system including an in-vehicle unit and an operation management computer according to the second embodiment of the present disclosure.

FIG. 9 illustrates a second embodiment of the present disclosure, which is an example of modification of the first embodiment. In the second embodiment, the in-vehicle unit 100, the operation management computer 200, and the like constitute a passenger compartment monitoring system 210. The passenger compartment monitoring system 210 monitors the passengers P who are boarding in the passenger compartment C and performs control to maintain order in the vehicle. The in-vehicle unit 100 and the operation management computer 200 cooperate with each other to execute substantially the same order maintenance process (see FIG. 8) as in the first embodiment.

In the second embodiment, the in-vehicle unit 100 causes the processor 61 to execute the vehicle-side passenger compartment monitoring program stored in the memory device 63. As a result, the in-vehicle unit 100 is equipped with the notification control unit 73 that is substantially the same as that of the first embodiment. When the operation management computer 200 of the management center 42 determines that the nuisance act or the like is occurring, the notification control unit 73 follows the instruction of the operation management computer 200 and performs actuation according to the type of the nuisance action or the like that is occurring.

The operation management computer 200 is installed in the management center 42, and is connected to each in-vehicle unit 100 of each vehicle ADV via the communication network NW. The operation management computer 200 mainly includes a control circuit having a processor 261, a RAM 262, a memory device 263, and an input/output interface. The processor 261 is hardware for arithmetic processing with a large scale and connected to the RAM 262, and can execute various programs. The memory device 263 includes a non-volatile storage medium, and stores various programs to be executed by the processor 261. The operation management computer 200 causes the processor 261 to execute the center-side passenger compartment monitoring program stored in the memory device 263. As a result, in the operation management computer 200, the communication control unit 274 is installed in addition to the association unit 71 and the situation recognition unit 72 that are substantially the same as those in the first embodiment.

The association unit 71 performs the associating process (see FIG. 4) as in the first embodiment. Specifically, the association unit 71 acquires the terminal ID read by the card reader 35 at the time of paying the fare of each passenger P through the vehicle external communication device 40 and the communication network NW. Further, the association unit 71 also acquires the detection information by the passenger recognition unit 32 through the vehicle external communication device 40 and the communication network NW. The association unit 71 remotely associates the passenger ID of each passenger P shown in the passenger compartment image with the terminal ID, and registers each mobile terminal 10a to 10c as the individual presentation device 20 of each passenger P.

The situation recognition unit 72 remotely recognizes the situation of the passenger compartment C, identifies the nuisance and the like, and authenticates the actor Ph of the act. The situation recognition unit 72 obtains the detection information by the passenger recognition unit 32, the sound of the passenger compartment of the microphone 33 and the video of the passenger compartment of the camera 31, the notification of occurrence and the notification of termination by the notifier Pi, etc. through the external communication device 40 for an outside device of the vehicle and the communication network NW. Upon receiving the occurrence notification from the notifier Pi, the situation recognition unit 72 analyzes the passenger compartment image and the passenger compartment sound, and when it is determined that the mutual contents are substantially the same, the occurrence of annoying behavior and the actor Ph are identified.

The communication control unit 274 transmits the type of nuisance act or the like occurring in the passenger compartment C and information indicating the actor Ph to the in-vehicle unit 100 via the communication network NW and the external vehicle communication device 40. As described above, in the case where, for example, an etiquette violation has occurred, the mobile terminal 10b of the actor Ph in the etiquette violation functions as the individual presentation device 20 and displays a message that asks the actor Ph for manner improvement. In addition, the communication control unit 274 executes a notification to the security center 43, the police organization, etc. when a criminal act is suspected or a person requiring rescue is generated.

As in the second embodiment described up to this point, even when the calculation for maintaining order is distributed on the vehicle side and the center side, the request for termination of the act can be transmitted to the actor Ph using the individual presentation device 20 (i.e., the mobile terminal 10c) specifically. Therefore, the similar effect as that of the first embodiment is achieved, and it is possible to suppress the nuisance while suppressing the annoyance caused by the termination request. In the second embodiment, the in-vehicle unit 100 and the operation management computer 200 both correspond to a "computer" and a "passenger compartment monitoring device".

Other Embodiments

Although the embodiments of the present disclosure have been described above, the present disclosure should not be understood as being limited to the aforementioned embodiments. The present disclosure can be applied to various embodiments and various combinations thereof, without departing from the spirits of the present disclosure.

In the first modification of the first embodiment, the situation recognition unit identifies the actor not only when the notification of the occurrence by the notifier is received but also when the occurrence of the manner violation is estimated from the passenger compartment sound and the passenger compartment image, and performs an individual actuation for actors. The in-vehicle unit of the modification 1 can suppress the continuation of manner violation even without the occurrence notification from the passenger.

In addition, the in-vehicle unit of the modified example 1 analyzes the behavior of the passenger in the passenger compartment by the recognition technology even when there is no notification of occurrence from the passenger, and when the criminal activity is detected with high probability, the unit notifies the management center. According to the first modification, it is possible to quickly restore the comfort of the passenger compartment even when the passenger without having a mobile terminal is disturbed by the bad manner behavior and the criminal behavior.

Both the image recognition and the voice recognition may not be used for the situation recognition in the passenger compartment. The situation of the passenger compartment may be estimated by only one of the image recognition and the voice recognition.

The type of the specific act targeted for the termination request may not be limited to the manner violation act, the criminal act, and the like described in the above embodiment. The type of such a specific action may be appropriately changed depending on, for example, the region (or a country) where the vehicle operates, the tendency of the user, the time zone, and the like. Further, items included in manner violations and criminal acts may be changed as appropriate.

For example, in the above-described embodiment, a serious nuisance act that may cause a crime is defined as a "criminal act". More specifically, an act that may be determined to be a crime in the future in the light of the criminal law in a future trial, and is an suspicion at the time of occurrence, is detected as a "criminal act". Alternatively, a serious nuisance that cannot be legally punished may also be detected as a "criminal act". In addition, the stored site photographs and passenger compartment videos, etc. serve as valid evidence when a criminal act is legally confirmed in the above-mentioned trial.

Further, in the above-described embodiment, the termination request using the individual presentation device is performed only when the manner violation acts are presented among the specific acts. However, even when there is a criminal act, an individual termination request may be made using the actor's mobile terminal as an individual presentation device. It should be noted that the change of the termination request according to the type of the specific action may not be performed.

In the above-described embodiment, in order to suppress the mischief notification, the terminal ID capable of specifying the notifier is transmitted together with the generated communication information. Alternatively, the anonymity may be emphasized, and the identification information for identifying the mobile terminal such as the terminal ID may not be attached to the occurrence notification.

In the above embodiment, the mobile terminal of each passenger is used as an individual presentation device. Alternatively, the configuration usable as the individual presentation device may not be limited to the mobile terminal. For example, a vibration device or a monitor device individually installed on the seat surface of each seat may function as an individual presentation device that individually asks attention to manner violations. Furthermore, the termination request may be issued only to the specific passenger who is the actor by reproducing the voice message using the directional speaker.

The in-car configuration such as a monitor and a speaker used for alerting passengers may be appropriately changed. In addition, frequent alerting may be likely to cause annoyance to passengers. Therefore, when the in-vehicle unit issues a warning using the monitor and the speaker, the in-vehicle unit may not perform the warning using these for a certain period of time.

In the above embodiment, the notifier of the occurrence notification has a role of transmitting the end notification. Alternatively, the improvement confirmation of manner violation may be performed by another passenger. Alternatively, improvement of manner violation may be confirmed based on the analysis result of the passenger compartment image and the passenger compartment sound.

The occurrence notification in the above-described embodiment is transmitted to the in-vehicle communication device. Alternatively, in the mode in which the situation recognition is performed in the management center as in the second embodiment, the mobile terminal may transmit the occurrence notification to the operation management computer through the communication network, not to the in-vehicle communication device.

In the above embodiment, the scene in which the request for the manner violation is executed based on one notification of occurrence has been described. Alternatively, scenes in which a plurality of occurrence notifications estimated to have the same content are received may be assumed. For example, when multiple occurrence notifications sent from different passengers indicate the same occurrence location, the in-vehicle unit may determine as the annoying act and perform a strong warning even if each occurrence notification indicates a bad manner act.

Specifically, when the number of occurrence notifications indicating the same issue is three or less, the individual alert is issued using the individual presentation device. On the other hand, when four or more occurrence notifications indicating the same case are received, the in-vehicle unit does not issue an individual attention and immediately issues a warning using the speaker. Further, when the six or more occurrence notifications are received, the in-vehicle unit immediately executes the notification to the management center and the like.

In the above embodiment, an example in which the passenger watching system and the in-vehicle order maintenance system using the passenger compartment monitoring method according to the present disclosure are applied to an unmanned bus has been described. Alternatively, the vehicle to which the watching system and the in-vehicle order maintenance system can be applied may not be limited to the unmanned bus and may be a manned vehicle. For example, the above-mentioned watching system and in-vehicle order maintenance system may be applied to railway vehicles, articulated buses, etc. where it is difficult for a driver to monitor the entire passenger compartment.

In the above-described embodiment, the in-vehicle unit and the operation management computer have been described as computers that implement the passenger compartment monitoring method of the present disclosure. The processing related to such a passenger compartment monitoring method may be carried out in a distributed manner by a passenger compartment management system including both an in-vehicle unit and an operation management computer, in cooperation with both computers. Moreover, the computer that implements the passenger compartment monitoring method is not limited to these computers. For example, a plurality of electronic control units mounted on the vehicle may perform distributed processing of the passenger compartment monitoring program. Alternatively, the operation management computer installed in the management center may process substantially all operations of the passenger compartment monitoring program.

As described above, each function provided by each control circuit of the in-vehicle unit and the operation management computer can be provided by software and hardware that executes the software, only software, only hardware, or a combination thereof. Further, when such a function is provided by an electronic circuit being hardware, each function can also be provided by a digital circuit including a large number of logic circuits or by an analog circuit.

The data processing related to the passenger compartment monitoring program, and the specific configuration of the processor that executes the instructions and the codes may be appropriately changed. The processor may include a GPU (Graphics Processing Unit) or the like, in addition to including a CPU (Central Processing Unit). Further, the processor may include an FPGA (Field-Programmable Gate Array) and an accelerator (for example, DSP (Digital Signal Processor)) specialized for learning and estimation of AI technology. In addition, the processor may be mounted on an FPGA, an ASIC (Application Specific Integrated Circuit), or the like.

Various non-transitory tangible storage medium (i.e., non-transitory tangible storage medium) such as a flash memory and a hard disk can be employed as the memory device for storing the passenger compartment monitoring program. The form of such a storage medium may be appropriately changed. For example, the storage medium may be in the form of a memory card or the like, inserted into a slot portion provided in the computer, and electrically connected to the control circuit. Further, the storage medium is not limited to the memory device of the in-vehicle device as described above, and may be an optical disk serving as a copy base of the program to the memory device, a hard disk drive of a general-purpose computer, or the like.

The control unit and the method thereof described in the present disclosure are realized by a dedicated computer provided by configuring a processor and a memory programmed to execute one or more functions embodied by a computer program may be done. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

Here, the flowchart described in this application or the process of the flowchart is composed of a plurality of sections (or referred to as steps), and each section is expressed as, for example, S121. Further, each section can be divided into multiple subsections, while multiple sections can be combined into one section. Furthermore, each section thus configured may be referred to as a device, module, or means.

Although the present disclosure has been described in accordance with the examples, it is understood that the present disclosure is not limited to such examples or structures. The present disclosure also includes various modifications and modifications within an equivalent range. In addition, various combinations and forms, and further, other combinations and forms including only one element, or more or less than these elements are also within the sprit and the scope of the present disclosure.

What is claimed is:

1. A passenger compartment monitoring method for monitoring a passenger compartment of a vehicle on which a plurality of passengers are boarded, which is executed by a computer, the method causing at least one processor to:
  associate an individual presentation device for providing individual notification to each of the passengers with each of the passengers boarding the passenger compartment;
  specify one of the passengers who is an actor of a predetermined specific action together with a content of the specific action; and
  show the content of the specific action and request the actor to stop the specific action using the individual presentation device associated with the actor,
  wherein:
  the specifying of the actor is performed based on an occurrence notification from an other one of the passengers who is boarding the passenger compartment, and
  the specifying of the actor is performed when a content of the occurrence notification from the other one of the passengers boarding the passenger compartment matches a content of detection information of a passenger compartment sensor for detecting a state of the passenger compartment.

2. The passenger compartment monitoring method according to claim 1, wherein:

the specifying of the actor is performed based on detection information of a passenger compartment sensor that detects a state of the passenger compartment.

3. The passenger compartment monitoring method according to claim 1, the method further causing the at least one processor to:

acquire identification information of a mobile terminal together with the occurrence notification when receiving the occurrence notification transmitted by a mobile terminal carried by the other one of the passengers.

4. The passenger compartment monitoring method according to claim 1, the method further causing the at least one processor to:

terminate the requesting for the actor to stop the specific action using the individual presentation device based on a termination notification from the other one of the passengers who inputs the occurrence notification.

5. The passenger compartment monitoring method according to claim 1, the method further causing the at least one processor to:

changing a mode of requesting for the actor to stop the specific action according to a type of the specific action by the actor.

6. A passenger compartment monitoring device mounted on a vehicle for monitoring a passenger compartment of the vehicle, in which a plurality of passengers board, the passenger compartment monitoring device comprising:

an associating unit that is configured to associate an individual presentation device for providing individual notification to each of the passengers with each of the passengers boarding the passenger compartment;

an action specifying unit that is configured to specify one of the passengers who is an actor of a predetermined specific action together with a content of the specific action; and a notification control unit that is configured to show the content of the specific action and request the actor to stop the specific action using the individual presentation device associated with the actor, wherein:

the specifying of the actors is performed based on an occurrence notification from an other one of the passengers who is boarding the passenger compartment, and the specifying of the actor is performed when a content of the occurrence notification from the other one of the passengers boarding the passenger compartment matches a content of detection information of a passenger compartment sensor for detecting a state of the passenger compartment.

7. A passenger compartment monitoring device mounted on a vehicle for monitoring a passenger compartment of the vehicle, in which a plurality of passengers board, the passenger compartment monitoring device comprising:

a processor, wherein:

the processor is configured to:

associate an individual presentation device for providing individual notification to each of the passengers with each of the passengers boarding the passenger compartment;

specify one of the passengers who is an actor of a predetermined specific action together with a content of the specific action; and show the content of the specific action and request the actor to stop the specific action using the individual presentation device associated with the actor, wherein:

the specifying of the actor is performed based on an occurrence notification from an other one of the passengers who is boarding the passenger compartments, and the specifying of the actor is performed when a content of the occurrence notification from the other one of the passengers boarding the passenger compartment matches a content of detection information of a passenger compartment sensor for detecting a state of the passenger compartment.

\* \* \* \* \*